United States Patent [19]

Bauman et al.

[11] 3,860,146
[45] Jan. 14, 1975

[54] SEED DISPENSING MECHANISM

[75] Inventors: Jack L. Bauman, Naperville; Darlo E. Lienemann, Darien, both of Ill.

[73] Assignee: International Harvester Company, Chicago, Ill.

[22] Filed: July 9, 1973

[21] Appl. No.: 377,478

[52] U.S. Cl. .............................. 221/211, 221/168
[51] Int. Cl. .................................... B65h 3/08
[58] Field of Search .................. 222/193, 194, 370; 221/211, 278, 160–162, 168; 209/95, 86

[56] References Cited
UNITED STATES PATENTS

| | | | |
|---|---|---|---|
| 783,269 | 2/1905 | Hayes | 209/95 |
| 1,070,092 | 8/1913 | Wright et al. | 209/95 |
| 1,734,261 | 11/1929 | Larson | 209/95 |
| 3,039,655 | 6/1962 | Pfeuffer | 222/193 |
| 3,412,908 | 11/1968 | Ferrault | 222/370 |
| 3,415,450 | 12/1968 | Hawk | 222/193 |
| 3,637,108 | 1/1972 | Loesch et al. | 222/194 X |

Primary Examiner—Stanley H. Tollberg
Assistant Examiner—H. Grant Skaggs
Attorney, Agent, or Firm—F. David AuBuchon; Floyd B. Harman

[57] ABSTRACT

A pneumatic seed dispensing mechanism for a mobile planter of the type which employs a horizontal rotary pressurized drum having apertured in the periphery thereof in which seeds are individually captured by air pressure acting radially on the seeds, and in which such radial air pressure is relieved as the thus captured seeds pass through the upper region of the drum so as to selectively release and discharge them into seed conveying tubes leading to respective planting rows. Seeds are delivered to the drum through a seed delivery chute from a pressurized seed hopper which is maintained at a higher pressure level than the drum, and seed leveling means, both mechanical and pneumatic, are provided within the drum for leveling the seed mass within the drum to compensate for drum inclination when the planter encounters a downgrade.

15 Claims, 9 Drawing Figures

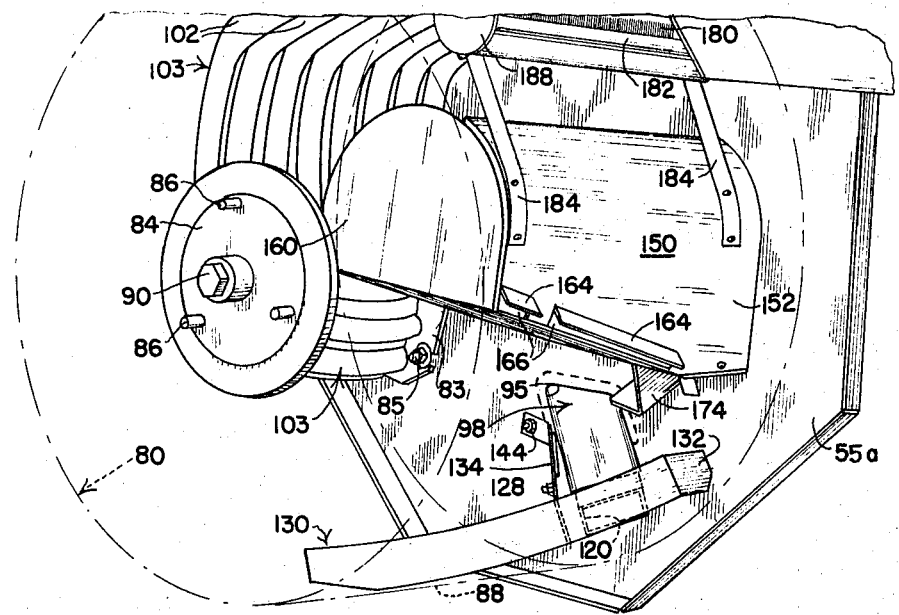
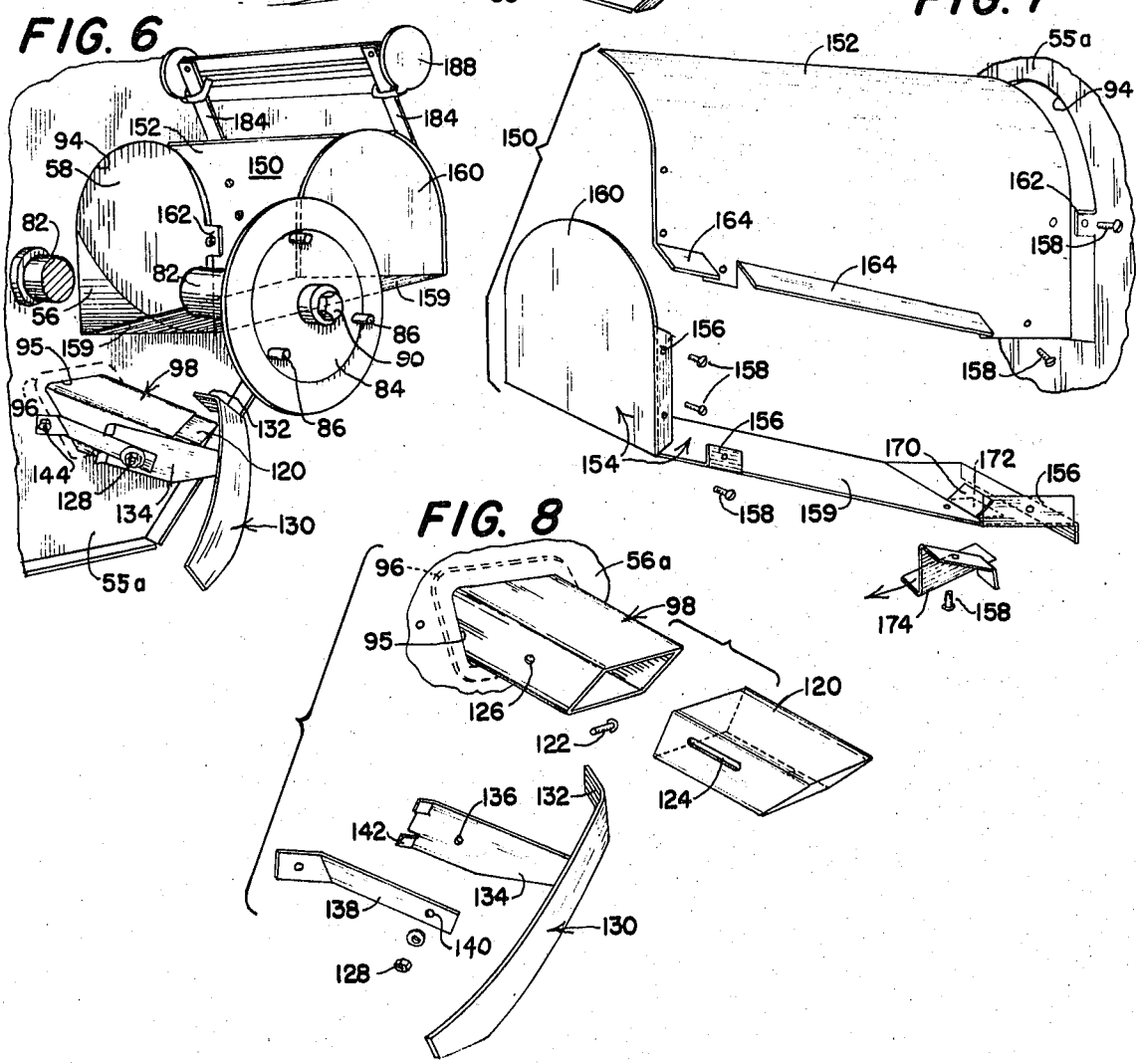

3,860,146

SEED DISPENSING MECHANISM

The present invention relates to agricultural implements and has particular reference to a pneumatic seed dispensing mechanism for a mobile planter and in which seed is delivered to the planting rows in a more uniform manner than has heretofore been possible with conventional planters of a similar nature. The invention is specifically concerned with a seed dispensing mechanism of the general type shown and described in U.S. Pat. No. 3,637,108, granted on Jan. 25, 1972 and entitled "Seed Planter" and in a copending application bearing Ser. No. 146,258, filed on May 24, 1971 and entitled "Pressure Equalizer for Pneumatic Planter" over which mechanisms the present seed dispensing mechanism represents an improvement. Reference is further made to U.S. Pat. No. 3,412,908 of Nov. 26, 1969 which discloses a pneumatic planter having a pressurized seed hopper.

A pneumatic seed dispensing mechanism of the general type under consideration employs a pressurized horizontally disposed rotary shell-like drum having longitudinally spaced circular rows of apertured depressions in the periphery thereof and to which seed is delivered from a seed hopper. As the depressions move beneath the tumbling mass of seed within the drum, each depression picks up an individual seed and carries it to the upper region of the drum, the seed clinging to the drum periphery under the influence of radially directed air pressure tending to escape through the aperture. In the upper region of the drum, a series of elastomeric rollers seal off the apertures, thus relieving the radial air pressure so that the seeds fall into respective seed conveying tubes which conduct them to the planting rows.

Conventional seed dispensing mechanism of the type set forth above is possessed of certain limitations, principal among which is the inability of the mechanism to properly handle seed when the planter encounters an incline, especially a downgrade where the tendency is for the seed mass to collect in the forward region of the drum, thus leaving a sparcity of seeds in the rear region thereof so that the circular rows of apertures which operate in such rear region are unable to pick up seeds. This obviously results in seed skipping in the corresponding planting furrows.

The present invention is designed to overcome the above noted limitation that is attendant upon the construction and use of conventional pneumatic drum-type planters and, toward this end, the invention contemplates the provision of a novel seed dispensing mechanism wherein both mechanical and pneumatic means are fixedly disposed within the drum, such means cooperating with each other to impart a seed distributing or "leveling" effect upon the seed mass within the drum tending to force the seed rearwardly within the drum so that it will cover all of the circular rows of seed-conveying depressions regardless of the inclination at which the drum may be operating at any given moment.

Insofar as the mechanical seed leveling means is concerned, this means assumes the form of a horizontal leveling bar which is fixedly positioned in the lower region of the rotating drum at an angle relative to the vertical plane of the drum axis. This bar spans all of the circular rows of seed-conveying depressions and is contoured so that, despite its angular position, it lies close to the drum periphery throughout its length. Thus, as the drum rotates, this fixed leveling bar functions in the manner of a scoop to push seeds rearwardly in the drum and over all of the circular rows of depressions despite any downgrade which may be encountered by the planter.

Insofar as the pneumatic seed leveling means is concerned, a series of fixed baffles, louvers, vanes and the like are disposed within the drum and cooperate with one another in such a manner that the net effect is to direct streams of air against the seed mass.

A further limitation that is present in connection with conventional seed distributing mechanism of this general character principles in the tendency for seed to move sluggishly through the usual inclined seed delivery chute which portion seed from the seed hopper to the rotating drum, this despite the fact that in certain dispensing mechanisms both the seed hopper and drum are pressurized. According to the present invention, and in order to obviate this latter difficulty, means are provided for maintaining the hopper pressurized at a slightly higher pressure level than the drum, thus accelerating the flow of seed through the delivery chute and it also is self-compensating in that under circumstances where seed would ordinarily tend to flow at less than full delivery chute capacity, the excess air pressure in the hopper will correct the underfill.

A further novel feature of the present invention resides in the provision of a seed tube extension at the drum end of the seed delivery chute, the extension being adjustable to accommodate different seed levels within the drum for different seed crops, and to prevent a seed overfill for any given crop.

A related feature of the invention resides in the placement of jet-producing means within the delivery chute to further assist seed flow through the latter. This jet-producing is most effective when the delivery chute is not filled with seed and thus tends to insure an even flow of seed through the delivery chute.

The provision of a seed dispensing mechanism such as has briefly been outlined above, and possessing the stated advantages, constitutes the principal object of the present invention. Other objects and advantages of the invention, not at this time enumerated, will become readily apparent as the following description ensues.

In the accompanying four sheets of drawings forming a part of this specification, one illustrative embodiment of the invention has been shown.

In these drawings:

FIG. 1a is an enlarged fragmentary sectional view largely schematic in its representation, taken transversely through an arcuate extent of a seed distributing drum which is employed in connection with the invention and showing the manner in which seeds are carried by the drum for distribution and are subsequently released from the drum;

FIG. 5 is an enlarged fragmentary right rear perspective view of the seed dispensing mechanism, the view being taken in the vicinity of the seed distributing drum but with the latter being shown in phantom so as to illustrate the fixed internal functinal components thereof;

FIG. 6 is a left perspective view of the structure which is shown in FIG. 5;

FIG. 7 is an enlarged exploded perspective view of an air distribution hood which is employed in connection with the invention; and FIG. 8 is an enlarged exploded perspective view of a combined or interrelated seed tube extension and a seed leveling bar which are employed in connection with the invention.

Figure 1:
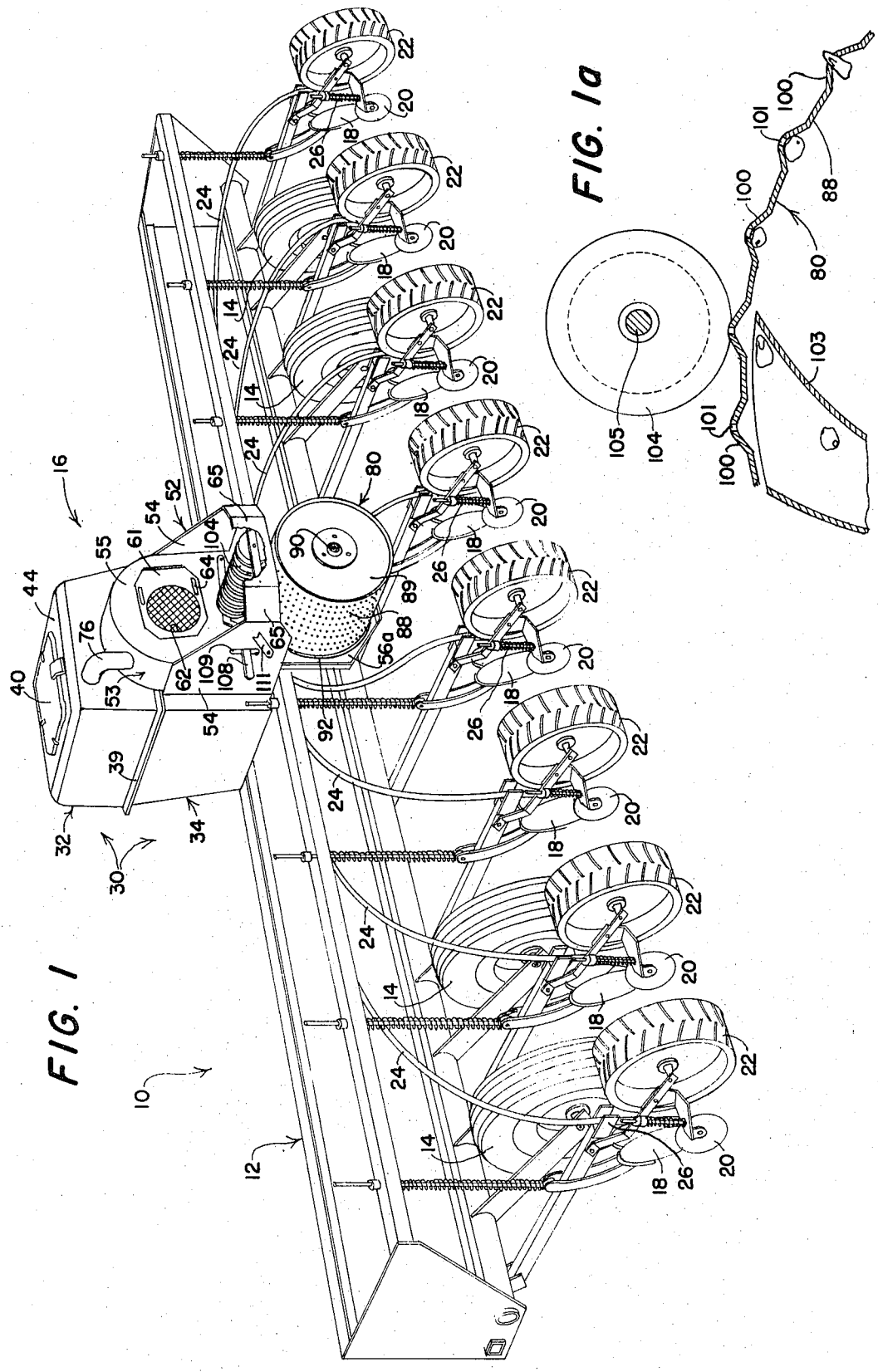
FIG. 1 is a rear perspective view of a seed dispensing mechanism constructed in accordance with the priciples of the present invention and showing the same operatively installed upon a mobile agricultural planter, a portin of the dispenser framework being broken away in the interests of clarity.

Referring now to the drawings in detail and in particular to FIG. 1, a mobile planter with which the seed dispensing mechanism of the present invention is associated is designated in its entirety by the reference numeral 10 and includes the usual transversely elongated frame structure 12 which is supported by ground wheels 14 and upon which the seed dispensing mechanism 16 is fixedly supported. The planter further includes the usual discs 18 for producing furrows in the ground and into which seeds are individually dropped, and trailing furrow-closing discs 20 which occupy positions rearwardly of the discs 18. Press wheels 22 trail the discs 20 in the usual manner of planter operation. The planter is also provided with a series of seed-conveying tubes or conduits 24 leading from the seed dispensing mechanism 16 and having discharge ends which are supported by fixtures 26 immediately behind the discs 18.

The arrangement of parts thus far described is purely conventional and no claim is made herein to any novelty associated with the planter framework, its tractional supporting means, or other adjuncts. The novelty of the present invention resides rather in the construction, combination and arrangement of parts which are associated with the seed dispensing mechanism 16 and which will subsequently be described in detail. For a more complete understanding of the planter framework and its associated ground preparation and other instrumentalities, reference may be had to the aforementioned U.S. pat. No. 3,637,108 and application Ser. No. 146,258, which by reference thereto are hereby incorporated in and made a part of the present application insofar as they are consistent with the present disclosure.

The seed dispensing mechanism 16 involves in its general organization a composite casing 30 which is comprised of an upper section 32 and lower section 34 (FIGS. 1, 2 and 3), the former section seating in rim-to-rim fashion on the lower section. As shown in FIGS. 3 and 4, a relatively deep imperforate trough-like bowl 36, having a rearwardly and downwardly slanting bottom wall 37 is suspended from the upper rim region of the lower casing section 34, is almost entirely disposed within such section, and defines, in combination with the upper casing section 32, a hermetically sealed seed hopper 38 for reception of the seed which is to be planted. A suitable lip-type seal (not shown) is associated with a seating flange 39 on the upper casing section 32 and serves to effect a pneumatic seal between the meeting rims of the two casing sections 32 and 24, as well as the rim of the bowl 36.

The seed hopper 38 is provided with a hinged closure lid 40 which normally closes a filling opening 42 provided in the top wall 44 of the upper casing section 32 and to which wall the lid is connected by an offset hinge construction 46. Clamping devices 48, in combination with a sealing gasket 50, serve to sealingly clamp the lid 40 in position over the filling opening 42.

Projecting rearwardly from the lower casing section is an outrigger frame 52 (FIGS. 1, 2 and 3) which serves as a support for a blower assembly 53. The frame 52 includes a pair of spaced apart, vertically disposed supporting plates 54 which support therebetween front and rear transverse plates 55 and 56 (FIG. 2) having lateral flanges 57 which are secured to the supporting plates 54. These two transverse plates, in combination with the usual involute blower side wall or scroll 58, define a blower casing having an air inlet opening 60 in the upper region of the wall 55 (FIG. 4). A sliding damper plate 61 having a circular screened opening 62 formed therein affords a means whereby the effective size of the opening 60 may be varied. Threaded pin-and-slot type clamping devices 64 hold the damper plate 61 in any desired position of adjustment. A narrow outwardly bowed reinforcing plate 65 extends between the two side plates 54.

Disposed within the blower casing is a blower fan 66 which is carried on a shaft 68 (FIGS. 2, 3 and 4), the latter being mounted in bearings 70 and being driven by a power train (not shown) from the power take-off shaft of the tractor. The blower casing is provided with an upper air outlet 74 which communicates through an elbow conduit 76 with the interior of the hopper 36 through a hopper inlet opening 78. Air delivered to the hopper through the conduit 76 creates an air pressure differential within the hopper which is appreciably higher than ambient atmospheric pressure and this higher pressure is used, according to the present invention, in a manner that will be made clear presently, to enhance the flow of seeds from the hopper to a rotary cylindrical seed distributing drum 80 which is shown in its entirety in FIGS. 1 to 4 inclusive but is shown in phantom lines in FIG. 5 in order to reveal the nature of certain internal fixed components which are associated therewith.

The rear transverse plate 55 projects downwardly below the side plates 54 and constitutes a downward extension 55a which serves to rotatably support the rotary seed distributing drum 80. Accordingly, and as best shown in FIGS. 4 and 6, a drum-supporting drive shaft 82 projects rearwardly through the plate extension 55a and carries at its rear end a torque-applying hub 84 which is secured to the shaft and provided with a series of circumferentially spaced driving lugs 86. The drum 80 is comprised of a cylindrical shell or wall 88 having a rear end wall 89 (FIG. 1) which is apertured to receive the driving lugs 86 and which is secured in position on the shaft 82 by a bolt 90.

The front circular rim of the drum 80 is open but when the drum is in position on the shaft 82 this front rim, which includes a sealing ring 92, directly opposes the planar rear of the plate extension 55a. The shaft 82, and consequently the seed distributing drum 80 is adapted to be driven under the influence of the forward tractional movement of the planter by a suitable power train (not shown) extending from one of the ground wheels 14.

The blower 53, in addition to supplying air under pressure to the seed hopper 38, also supplies air to the interior of the drum 80 to pressurize the latter. Accordingly, and as best seen in FIGS. 3, 4 and 6 the lower region of the blower casing, as defined by the plates 55 and 56 and the involute side wall or scroll 58, communicates at its lower region with a lower blower outlet in the form of an arched door-shaped opening 94 (FIGS. 4, 6 and 7) which is provided in the depending plate extension 55a. This lower air outlet opening 94 of the blower also constitutes an air inlet opening for the drum. Air is continuously supplied to the interior of the drum 80 through this latter opening while at the same time it is supplied to the hopper 38 through the elbow conduit 76 so that at all times both the hopper and drum are maintained pressurized, even when the drum stops rotating as the planter is being turned at the end of a planting row.

In addition to the door-shaped air inlet opening 94 for the drum 80, a second opening 95 (FIGS. 4, 5, 6 and 8) is formed in the depending plate extension 55a for the purpose of introducing seed into the drum for subsequent tumbling motion within the drum. Projecting through this latter opening 95, and sealed to the rim thereof by a suitable lip seal 96 is an inclined seed delivery chute 98 (see also FIG. 3), which is rectangular in transverse cross section and communicates at its upper end with a seed outlet 99 in the lower region of the trough-like bowl 36 which constitutes the hopper bottom. Seed which is disposed within the hopper 38 thus flows downwardly through the delivery chute 98 and into the interior of drum 80 to a point of deposit. The cylindrical shell 88 of drum 80 is formed with a plurality of circular rows of depressions 100. Each depression 100 has an opening 101 formed therein. The drawings illustrate a drum 80 having eight circular rows of openings 101, however, more or fewer rows could be provided. It should also be understood that the size and shape of the depressions 100 and openings are determined by the particular material being planted and for some seeds the depressions 100 could be eliminated.

A seed manifold 103 having a flange 83 is secured to plate extension 55a by nuts and bolts 85. The seed manifold is made up of a plurality of manifold branches 102 each having an open top aligned with the circular rows of openings 101. The manifold branches 102 extend through plate extension 55a, as best seen in FIG. 3, and the conduits 24 are connected thereto.

Individual seeds from the seed mass that has been deposited in drum 80 through delivery chute are held against the openings 101 within the depressions 100 as a result of the flow of air from within the drum 80 outwardly through openings 101. The drum 80 rotates carrying the captured seeds with it toward the twelve o'clock positions and then, at such position, a series of eight rubber or other elastomeric rollers 104 (FIGS. 2, 1a and 4) which ride tractionally on the outer surface of the drum 80 slightly in advance of the twelve o'clock position, pass over the various depressions 100 and close off the openings 101 associated therewith, thus equalizing the air pressure on all sides of the seeds so that the latter are no longer constrained to cling to the drum wall. At this time, the seeds are disposed directly above the manifold 103, one seed in each row being vertically aligned with one of the manifold branches 102, so that such release of the seeds causes the same to fall by gravity into respective manifold branches.

In some instances, depending upon the size and shape of the individual seeds, a particular seed will seat within a depression 100 in such a manner that it projects partially outwardly through the opening 101 as shown at the right hand side of FIG. 1a. In such an instance, when the depression 100 reaches the twelve o'clock position, the associated roller 104 will make physical contact with such seed, thereby forcing the same from the depression and inwardly of the drum, after which the roller will seal the opening. Whether a seed be thus forcibly ejected from the opening or whether it be released due to relief of its radial pneumatic bias, the result will be the same and the seed will fall into the manifold 103 by gravity at the twelve o'clock position.

Figure 2:
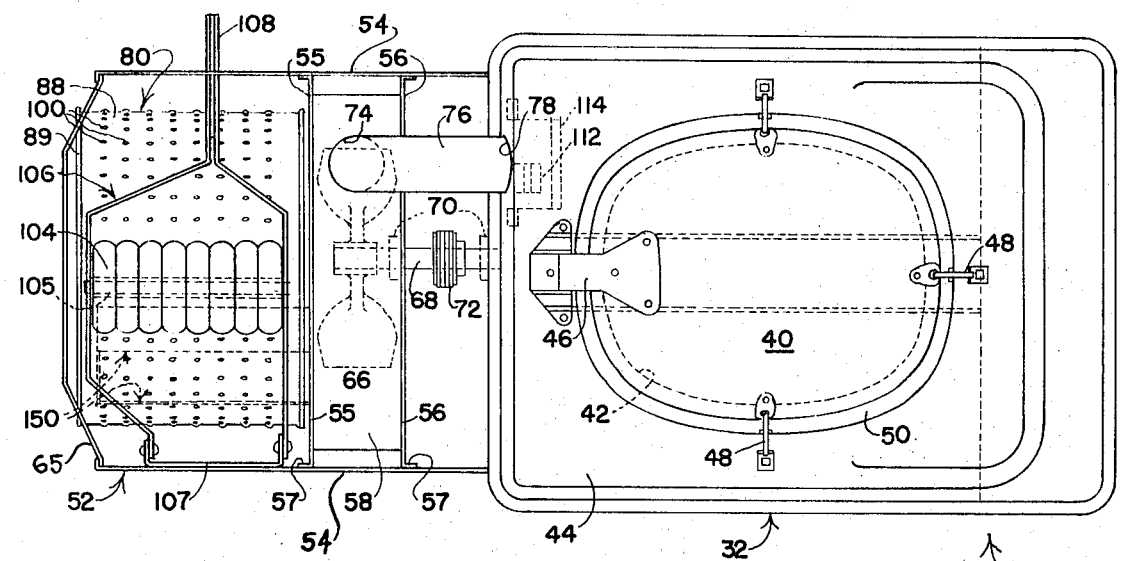
FIG. 2 is a top plan view of the seed dispensing mechanism per se.
Figure 3:
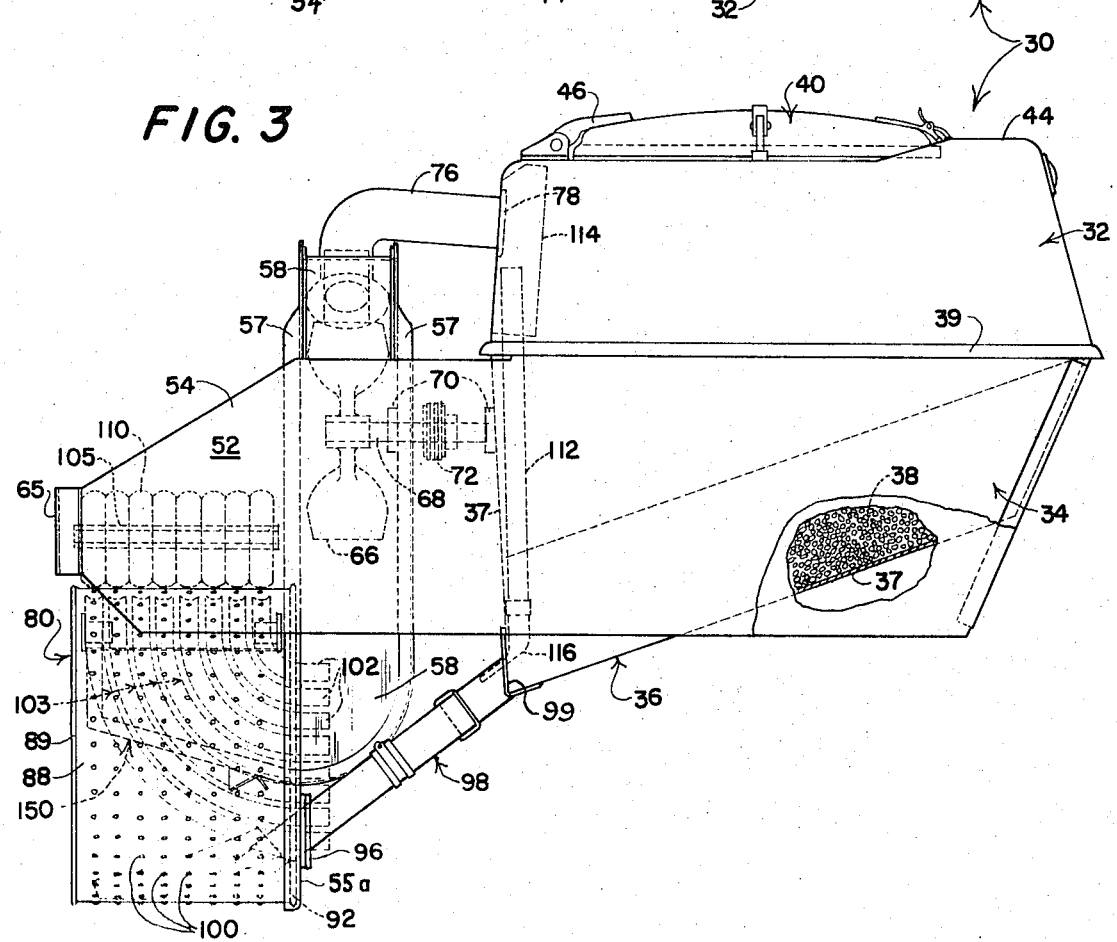
FIG. 3 is a right side elevational view of the dispensing mechanism with a portion of the hopper wall broken away.
Figure 4:
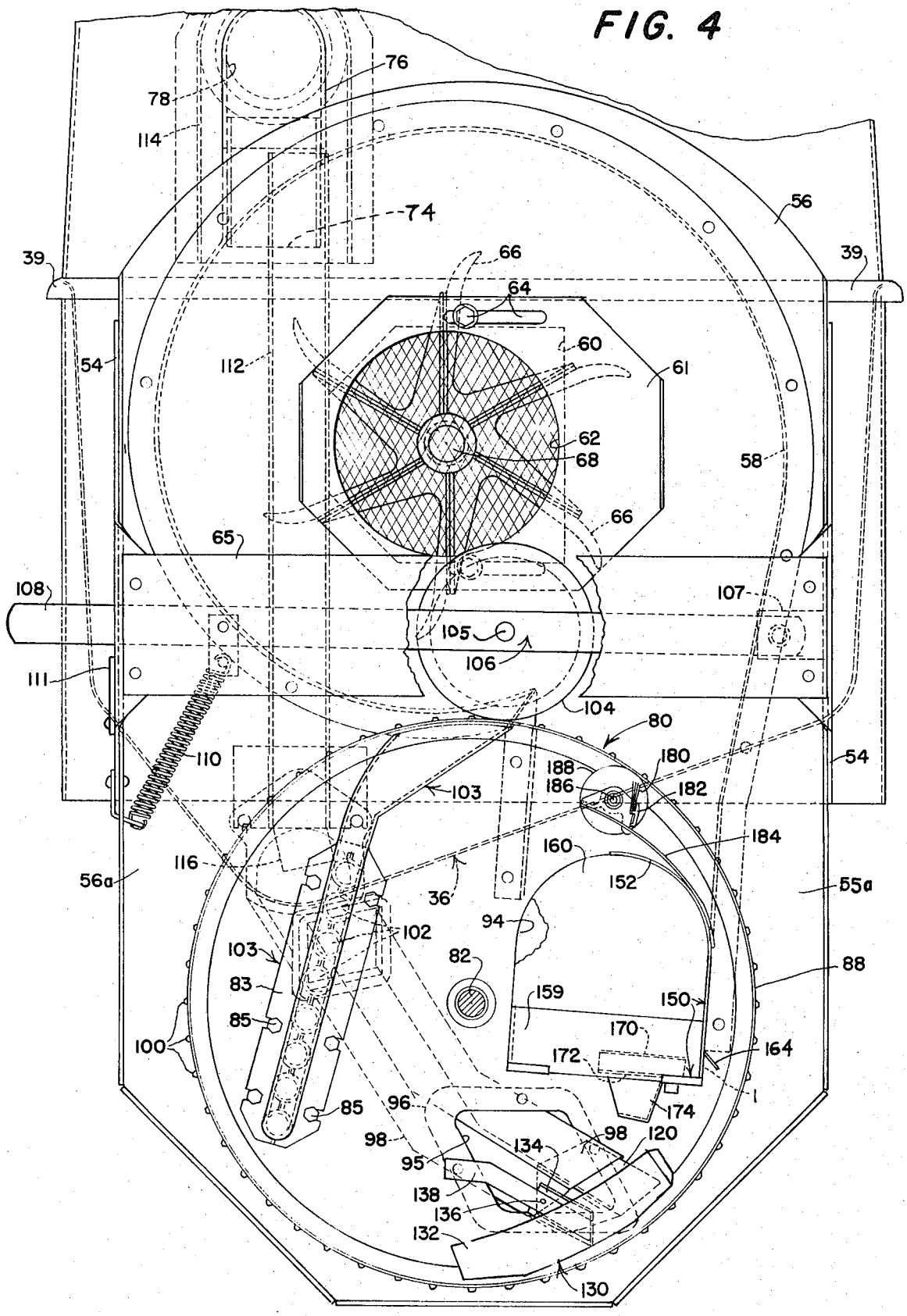
FIG. 4 is an enlarged fragmentary rear elevational view of the seed dispensing mechanism, the rear closure plate of the seed distributing drum being removed and portions of the dispenser casing being broken away to more clearly reveal the nature of the invention.

The elastomeric rollers 104 are disposed in side-by-side relationship as shown in FIGS. 2 and 3 for free rotation on a horizontal shaft 105 (see also FIG. 4) which extends across the medial region of a forked frame 106, which is pivoted to a bracket 107 carried by the right side plate 54. The frame is provided with a handle portion 108 which projects through a slot 109 (FIG. 1 in the left side plate 54 so that it is accessible for manipulation exteriorly of the outrigger frame 52. A spring 110 extends between the frame 106 and the side plate 54 and is effective to yeildingly urge the rollers 104 into seating engagement with the outer surface of the drum. A pivoted latch finger 11 positioned below the handle portion 108 affords a means whereby the roller-carrying frame 106 may be locked in its raised position during idle transportation of the planter.

It is pointed out that the above-described method of seed distribution from a seed hopper to a distribution manifold, utilizing a rotating perforate drum such as the drum 80, is not novel as evidenced by the aforementioned U.S. Pat. No. 3,637,108. It has been found, however, that with such a method, considerable difficulty is encountered in maintaining the seed mass which is disposed within the drum evenly spread across the bottom of the drum in a longitudinal direction to insure the fact that each row of depressions 100 will be assured of a continuous supply of seeds for conduction to the twelve o'clock position of seed release as previously outlined. For example, when the planter encounters a downgrade, the tendency will be for the seed mass to flow forwardly in the drum and collect in the forward region of the drum, thus leaving the rear region thereof devoid of seeds so that the depressions will travel upwardly without their oneseed quota. Similarly, when the planter encounters an upgrade, the tendency is for seeds to collect in the rear region of the drum so that there is a sparcity of seed for pick up by the forward rows of depressions 100.

It would appear to be obvious that the difficulty of maintaining an even distribution of seed over all of the eight rows of depressions 100 in the drum would automatically be overcome by increasing the rate of feed of seed into the drum so as to cause the latter to operate at a higher seed level, i.e. with a larger volume of seed in the drum. However, actual practice has shown that such is not the case. The reasons for this is not fully known but it is believed that a large depth of seed will prevent consistent seating of a seed in each depression 100 due to the overlying mass of seeds which, by their weight, tend to scrub, so to speak, the bottom of the drum and slide the seeds across the depressions so that they will not seat therein.

According to the present invention, in order to obviate this difficulty of seed gathering in the rim regions of the drum when the planter operates on an incline, a series of fixed non-rotatable instrumentalities are disposed within the rotating drum and these include a novel adjustable seed tube extension by means of which the general level of seeds within the drum and the point of deposit may be regulated and kept within acceptable limits. Additionally, a series of novel fixed air baffles, vanes, louvers and the like by means of which the air which enters the drum through the aforementioned door-shaped opening 94 are strategically directed against the seed within the drum for spreading purposes. Still further, novel seed spreading and leveling bar is fixedly disposed within the drum and operates by a sweeping or scooping operation due to relative bar and drum motion, to further spread the seed mass within the drum.

Apart from the matter of maintaining fore and aft seed continuity within the drum, the invention further utilizes a novel means for insuring an adequate supply of seed to the interior of the drum 80 from the hopper 38, such means being accomplished by maintaining a higher level of air pressure within the hopper than within the drum, together with a jet arrangement which assists the flow of seed downwardly through the seed delivery chute 98. These various fixed instrumentalities within the drum 80 cooperate with one another in a novel manner to produce a high velocity stream of air which is directed at the body of seed and which tends, when the planter is on an incline, to shift seed from the lower rim of the drum wall toward the higher rim, as well as to produce a mechanical distribution of the seed tending to retard a downhill flow of seed within the drum. By the provision of these fixed instrumentalities, all of the circular rows of depressions 100 are at all times assured of an adequate supply of seeds. These instrumentalities, both pneumatic and mechanical, will now be more fully described in detail and, in the description thereof, as well as in the claims appended hereto, directional references to front and rear are intended to be with respect to the front and rear ends of the planter.

Considering first the jet arrangement which assists the flow of seed from the hopper 38 to the interior of the drum 80 through the delivery chute 98, the differential air pressure existing between the interior of the drum and the hopper is an important factor in obtaining an adequate flow of seed. However, in order to further enhance such seed flow, a small but effective air jet is directed into the upper end of the delivery chute 98 in the direction of seed flow. Accordingly, as shown in FIGS. 2 and 3, a vertical seed-bypass air delivery tube 112 extends upwardly alongside the rear vertical wall of the hopper bowl 36 and has its upper open end encompassed by a shield 114, the function of which is to prevent seed from entering the tube. The hopper inlet 78 opens into the shield 114 which thus establishes a region of relatively high pressure within the hopper so that air issuing from the blower will be directed into the upper end of the delivery tube 112 so as to flow therethrough with a relatively high velocity. The upper and lower regions of the shield 114 are open so that a certain amount of air may escape into the medial region of the hopper.

The lower end of the tube 112 communicates with an air nozzle 116 which projects into the upper end of the delivery chute 98 and serves to direct a jet of air axially and downwardly into such tube to assist the seed flow therealong. When delivery chute 98 is not filled with seed the stream of air issuing from nozzle 116 creates a vacuum which draws seed to the delivery chute. This effect is not obtained when the delivery chute is full of seed and thus there is a self-regulating result tending to level out the feed rate through delivery chute 98.

It is to be noted at this point that the elbow conduit 76 communicates with the blower casing or scroll at a region close to the fan 66 where the air pressure developed within the scroll is higher than that which is developed in the more remote area of the door-shaped opening 94 leading to the interior of the drum 80. By such an arrangement, back-up air is prevented from entering the delivery chute 98 and detracting from the requisite air pressure in the drum for effective seed seating within the apertured depressions 100.

Considering next the aforementioned seed tube extension which regulates the level of seed and the point of deposit within the drum 80, and referring particularly to FIGS. 4, 5, 6 and 8, this extension 120 is in the form of a short length of tube stock which is rectangular in transverse cross section and of slightly smaller dimensions than those of the delivery tube 98. The extension fits snugly within the lower end of the tube and is telescopically slidable therein between a fully retracted position wherein it is withdrawn completely into the tube 98 and a projected position wherein it appreciably extends the effective length of the tube 98. The seed level in drum 80 is determined by the effective length of tube 98 through the use of extension 120. Since the seed delivery tube enters the drum through the opening 95 in a rearwardly and downwardly inclined direction, it will be apparent that the extent to which the extension 120 is projected will determine the height within the drum 80 at which seed will be maintained.

In order to capture the seed tube extension 120 within the delivery tube 98, as well as to clamp the same in any selected position of adjustment, a bolt 122 (FIG. 8) passes outwardly through a slot 124 formed in one side wall of the extension and through a hole 126 formed in the adjacent side wall of the delivery tube 98, and recieves a nut 128 thereon. The bolt and nut assembly serves a dual purpose in that it also is employed to fasten the aforementioned leveling bar in position within the drum 80 as will be described presently.

Insofar as the leveling bar is concerned, this bar 130 is best shown in FIGS. 5, 6 and 8 and it is partly supported from the depending plate section 55a of the outrigger frame 52 and partly from the seed tube 98. The bar 130 is in the form of a strip of flat metal stock which is arched rearwardly in its medial region on a long radius of curvature and the end regions of which are bent forwardly to provide end flaps 132. In addition to being arched rearwardly, the top and bottom edges of the strip are curved on a long radius. The bar 130 is supported at the outer end of a flat attachment strip 134, the outer end of which is welded to the bar at a region which is offset from the medial transverse plane thereof. The attachment strip is formed with a hole 136 through which the bolt 122 passes. A reinforcing strip 138 lies flat against the attachment strip 134 and is provided with a hole 140 through which the bolt 122 also passes. The strip 138 projects forwardly between a pair of outstruck tabs 142 at the forward end of the strip 134 and has its inner end region bent at an angle and secured to the depending plate section 55a by means of a bolt 144. When the nut 128 is tightened on the bolt 122, the leveling bar 130 and its attachment strip 134 become securely clamped in position against the lower end of the seed delivery chute 98.

The above described dual curvature of the leveling bar 130, i.e. its longitudinal and transverse curvature, enables the bar to be positioned within the drum in the lower region of the latter below the drive shaft 82 and at an angle on the order of 45° relative to a horizontal plane. In such a position, the leveling bar spans, or nearly spans, the eight circular rows of depressions 100 and extends substantially in edge-to-face relationship with respect to the inner cylindrical surface of the drum 80 and, geometrically speaking, defines a substantially helical projection line across the drum, the helix being modified by the slight arching of the leveling bar. The curvature of the lower edge of the leveling bar enables the bar to follow the arcuate portion of the drum which the bar spans so that all points on such arcuate lower edge are disposed in close proximity to, albeit spaced upwardly from, the depressions 100. Stated otherwise, a plane which intersects a cylinder at a 45° angle will define a curve similar to the curvature of the lower edge of the leveling bar. The line of intersection between the attachment strip 134 and the leveling bar 130 does not extend at a right angle to the upper edge of the strip 134 but rather it leans forwardly at an angle on the order of 135°.

From the above description it will be understood that the leveling bar functions in the manner of a scoop which, when the planter encounters a downgrade and seed tends to pile up in the forward corner of the drum 80, exerts a camming action on the seed issuing from the seed delivery chute 98 or its extension 120 and forces the same rearwardly toward the rear end of the drum, thereby spreading such seed evenly across all of the circular rows of depressions 100.

It is to be noted that the seed delivery chute 98 discharges seed into the drum at a point of deposit near the forward rim of the latter and this tends to compound the aforementioned problem of seed gathering in the forward end of the drum when the planter encounters a downgrade. The problem of seed gathering in the rear region of the drum 80 when the planter encounters an upgrade is not nearly as great since at the time seed is delivered into the drum near the front end thereof such seed immediately encounters the first several circular rows of depressions 100 and is picked up, so to speak, thereby. Because the planter is on an upgrade, the natural tendency for the seed is to flow rearwardly and across all of the eight circular rows of depressions. The distance which the lower curved edge of the leveling bar 130 is spaced radially inwardly from the inner surface of the drum is adequate to allow seed to flow rearwardly beneath the bar and, furthermore, the fact that the bar "leans" in a forward direction renders it inefficient as a scoop and thus there is no retardation of such rearward flow of seed. In short, piling of seed in the rear region of the drum when the planter encounters an upgrade does not present a serious problem inasmuch as the circular rows of depressions 100 near the forward rim of the drum always receive their full quota of seed directly from the adjacent seed delivery tube 98.

Leveling of seed in the lower region of the drum 80 by the leveling bar 130 is further enhanced by the provision of a novel system of air distribution in such lower region and embodying the aforementioned air baffles, vanes, louvers and the like which collectively function to direct air against the seed mass so as to assist the leveling bar 130 in bringing seed from the front region of the drum to the rear region when the planter encounters a downgrade. Accordingly, a two-piece sheet metal, hood-like baffle 150 (FIGS. 4 to 8 inclusive) including a curved section 152 and an angular section 154 are jointed together by various overlapping ears which, collectively, are designated by the reference numeral 156 (FIG. 7) and which are held in position by screws 158. The assembled baffle, which will hereinafter be referred to as a hood, embodies a bottom wall 159 over which the hood-like section arches to produce a fragmentary, tunnel-like structure which is devoid of a tunnel wall, one end of the tunnel being open and the other end being closed by an upstanding end wall 160 on the angular section 154. This structure seats endwise against the depending plate section 55a and is secured in position by an overlapping ear 162 on the rim region of the aforementioned door-shaped air inlet opening 94. This opening thus registers with the open end of the hood-like baffle so that air entering the drum through the opening 94 is blocked by the end wall 160 and flows laterally from the open side of the hood 150.

The door-shaped air inlet opening 94 communicates with the interior of the drum 80 at an eccentrically disposed three o'clock region as shown in FIG. 4 so that it lies immediately above the discharge end of the seed delivery chute 98. A divided outstruck flap 164, which is interrupted by one of the ears 156, extends along the lower horizontal edge of the curved section 152 and defines a slot 166 (FIG. 5) through which air may escape from the hood 150 and flow downwardly over the grain mass in the drum 80.

An upstruck ear 170 in the bottom wall 158 near the inlet opening 94 (FIG. 7) defines an additional air outlet 172 from the hood and a sheet metal ramp fitting 174 (see also FIG. 5) having a forward and a rearward extending surface is secured to the bottom wall 159 below such outlet and serves to direct air streams which from the hood 150 in both generally forward and rearward directions so as to assist the leveling bar 130 in its function of distributing the seed mass as previously set forth.

Apart from the matter of maintaining an even distribution of seed within the drum 80 in the longitudinal direction thereof so as to insure that the depressions 100 in the various circular rows of depressions will at no time operate in a region of seed sparcity, means are provided for clearing each depression 100 of excess seeds as it approaches the twelve o'clock position of seed release so that only a single seed will be released from such depression for placement in the manifold 103. Occasionally during rotation of the drum 80 more than one seed will gather in the vicinity of a depression 100. One reason for this is that occasionally a pair of seeds will adhere to each other by reasons of a foreign adhesive. Another reason is the presence of twin seeds. A third reason resides in the fact that a given seed may not seat accurately within a depression so that the rush of air around such seed and flowing outwardly through the associated opening 102 will attract one or more adjacent seeds, the several seeds clinging to one another by reason of a pneumatic vortex. According to the present invention, in order to dislodge such excess seeds, an elongated brush 180 (FIGS. 4 and 5) spans the distance across the various rows of depressions 100 and extends in close proximity to the inside surface of the drum, the brush extending in the longitudinal direction of the drum and being disposed approximately at the two o'clock position as shown in FIG. 4. The brush 180 is carried in a brush holder 182 which is secured to the distal end of a pair of leaf springs 184, the proximate ends of which are fixedly secured to the hood 150. The holder 182 embodies a horizontal shaft 186 which carries at its opposite ends a pair of traction rollers 188 which ride on the inside face of the drum 80 close to the opposite ends of the latter and serve to space the shaft, and consequently the holder 182 and its associated brush 180 a predetermined distance from the inside surface of the drum. The diameter of the rollers 188 and the disposition of the brush 180 on the holder 182 are such that the brush just clears the surface of the drum and assumes a position where it is in the path of any excess seeds which may cling to the inside surface of the drum either by adhesion or static electrical attraction, or which may cling to a seed which is dislodged by the brush in passing and fall back into the seed mass within the drum. For a more complete disclosure of the brush 180 and its intended function reference should be made to copending application Ser. No. 169,960 filed on Aug. 9, 1971.

From the above description it will be apparent that the leveling bar cooperates with the variously directed streams of air which issue from the hood through the opening 172 and slot 166 in such a manner as to move the seed from the low front corner of the drum to the high rear corner thereof when the planter is on a downgrade. Actual field tests have shown that this combined mechanical and pneumatic system of seed flow control more than doubles the amount of slope that the planter can tolerate when operating on a downgrade.

The invention is not to be limited to the exact arrangement of parts shown in the accompanying drawings or described in this specification as various changes in the details of construction may be resorted to without departing from the spirit of the invention. For example, although the invention has been illustrated herein for exemplary purposes in connection with an eight row planter, it is obvious that by increasing or decreasing the longitudinal dimension of the drum and making the hood 150 and leveling bar 130 commensurately longer or shorter, as well as resorting to other appropriate changes in dimensions, and seed dispenser 18 may readily be adapted to handle a greater or few number of seed rows. Furthermore, although the invention has been illustrated in connection with a rotating drum having small outstruck apertured depressions in the cylindrical periphery thereof, the principles of the invention are equally applicable to an apertured drum which is truly cylindrical and devoid of seed-isolating depressions, air pressure alone being sufficient to hold a unit seed against each aperture. Therefore, only insofar as the invention has particularly been pointed out in the accompanying claims is the same to be limted.

What is claimed is:

1. In a seed dispensing mechanism for a mobile planter, in combination, a framework including a stationary vertically disposed plate, an open-sided cylindrical shell mounted for rotation about a horizontal axis and having its open rim disposed in sealing relation with respect to said plate, an end wall secured to and closing the other end of the shell, said shell and end wall, in combination with said fixed plate, defining a seed-distributing drum, means for continuously depositing seeds at a deposit point adjacent said plate within said drum, means for supplying air under pressure to the drum to pressurize the same, said shell being formed with a plurality of longitudinally spaced circular rows or circumferentially spaced seed-retaining perforations which, upon rotation of the shell, receive respective unit seeds therein from the tumbling seed mass thereabove, hold the same under the influence of differential air pressure thereon, and transport the same upwardly and circumferentially of the drum for subsequent release in the upper region of the drum, means for receiving and dispensing the released seeds, and means supported by said plate and projecting therefrom, said last named means displaced from said point of deposit in the direction of rotation of said shell such that it is engageable with the seed mass, and effective incident to rotation of the shell for impelling portions of such seed mass along the drum and into overlying relationship with respect to the perforations which move beneath such seed mass in the circular row of depressions furthest from said deposit point.

2. In a seed dispensing mechanism, the combination set forth in claim 1, wherein said impelling means comprises an elongated leveling bar disposed in the lower region of the drum, extending at an oblique angle relative to the longitudinal direction of the drum, overlying and spanning all of said circular rows of perforations, and spaced from the shell substantially equidistantly.

3. In a seed dispensing mechanism, the combination set forth in claim 2, wherein said leveling bar is formed of flat metal stock the general plane of which is inclined upwardly and forwardly so that the bar exerts a scooping action on the seed mass within the drum.

4. In a seed dispensing mechanism, the combination set forth in claim 3, wherein the leveling bar is curved in the direction of its length on a relatively long radius.

5. In a seed dispensing mechanism, the combination set forth in claim 4, wherein the end regions of the leveling bar are turned out of the general curvature of the medial region thereof and in a forward direction.

6. In a seed dispensing mechanism, the combination set forth in claim 1, wherein said vertically disposed plate is formed with a seed inlet opening therein, and said means for depositing seed within the drum comprises a seed hopper on said framework above the level of the drum and provided with a seed outlet opening in its lower region, and an inclined seed delivery chute extending between said seed outlet opening and said seed inlet opening in sealed relation with respect thereto, said means for supplying air to the interior of the drum comprises a blower defining a relatively low pressure region and a relatively high pressure region and having an air outlet at each such region, said low pressure region communicating with the interior of the drum through an air inlet opening which is formed in said vertically disposed plate, and said means for supplying air to said hopper comprises a conduit extending between the air outlet in the high pressure region of the blower and the interior of the hopper, whereby the internal pressure in the hopper exceeds the internal pressure in the drum to enhance downward flow of seed through said seed delivery tube.

7. In a seed dispensing mechanism, the combination set forth in claim 6 including, additionally, a jet-producing nozzle effectively disposed in said seed delivery chute at a region remote from the drum for enhancing the flow of seed through said chute, and means for supplying air under pressure to said nozzle.

8. In a seed dispensing mechanism, the combination set forth in claim 7, wherein said means for supplying air to said nozzle comprises a seed bypass air delivery chute disposed within said hopper and extending from a region adjacent the upper end of the hopper to said nozzle.

9. In a seed dispensing mechanism, the combination set forth in claim 8 including, additionally, a seed shield encompassing the upper end of said air delivery chute for preventing entry of seed into the latter.

10. In a seed dispensing apparatus, the combination set forth in claim 6, wherein said seed delivery chute projects completely through said seed inlet opening in sealed relation and terminates in the vicinity of the foremost circular row of depressions.

11. In a seed dispensing apparatus, the combination set forth in claim 10, wherein the lower end of the seed delivery chute within the drum is provided with a telescopic extension which, by its extent of projection from the chute, determines the level of seed within the drum, and means are provided for securing said extension in selected positions of projection.

12. In a seed dispensing apparatus, the combination set forth in claim 1, wherein said vertically disposed plate is provided with a relatively large air inlet opening therein through which the pressurizing air is supplied to the drum, and baffle means are supported on said plate in the vicinity of said air inlet opening for directing a stream of air downwardly over the tumbling seed mass in the drum to spread the portions of the seed mass which are impelled rearwardly by said fixedly secured means into intimate contact with the shell in the vicinity of said rearmost circular row of depressions.

13. In a seed dispensing apparatus, the combination set forth in claim 12, wherein said baffle means comprises a hood-like structure mounted on said vertically disposed plate, having a substantially horizontal bottom wall, an end wall spaced from and opposing said air inlet opening, a side wall, and a partial top wall, and an out-struck inclined flap on said side wall defining an elongated slot through which air is directed downwardly.

14. In a seed dispensing mechanism for a mobile planter, in combination, a framework including a stationary vertically disposed plate, an open-sided cylindrical shell mounted for rotation about a horizontal axis and having its forward open rim disposed in sealing relation with respect to said plate, a rear end wall secured to and closing the rear end of the shell, said shell and end wall, in combination with said fixed plate, defining a seed-distributing drum, said plate being formed with a seed inlet opening therein, a seed hopper mounted on said framework above the level of the drum and provided with a seed outlet in the lower region thereof, an inclined seed delivery chute extending between said seed outlet and said seed inlet opening, a blower mounted on the framework and defining a relatively low pressure region and a relatively high pressure region, said low pressure region communicating with the interior of the drum through an air inlet opening which is formed in said vertically disposed plate, said high pressure region communicating with the interior of the hopper whereby the pressure maintained in the latter is higher than that which is maintained in the drum to enhance the downward flow of seed through said inclined seed delivery chute, said shell being formed with a plurality of longitudinally spaced circular rows of circumferentially spaced seed-retaining perforations which, upon rotation of the shell, receive respective unit seeds therein from the tumbling seed mass thereabove, hold the same under the influence of differential air pressure on the seeds, and transport the same upwardly and circumferentially of the drum for subsequent release in the upper region of the drum, means for receiving and dispensing the released seeds, a hood-like baffle mounted on said vertically disposed plate, having a substantially horizontal bottom wall, an end wall spaced from and opposing said air inlet opening, a side wall, a partial top wall, and an open side opposite said side wall, and an outstruck inclined flap on the side wall and defining an elongated slot through which air is directed downwardly, said open side of the hood-like baffle serving to direct air from said air inlet opening into the central regions of the drum to equalize the pressure of air against said shell coextensively therewith, and said downwardly directed air serving to spread the seed mass within the drum in a longitudinal direction over the bottom region of the rotating shell.

15. In a seed dispensing mechanism, the combination set forth in claim 14, wherein an opening is provided in the forward region of said bottom wall of the hood-like baffle in close proximity to said vertically disposed plate, and an inclined ramp surface is disposed immediately beneath said latter opening for directing air rearwardly and downwardly within the drum.

* * * * *